A. WILZIN.
APPARATUS FOR FLANGING THE TINS OR CANISTERS FOR PRESERVES.
APPLICATION FILED SEPT. 17, 1907.
928,618.
Patented July 20, 1909.
5 SHEETS—SHEET 1.
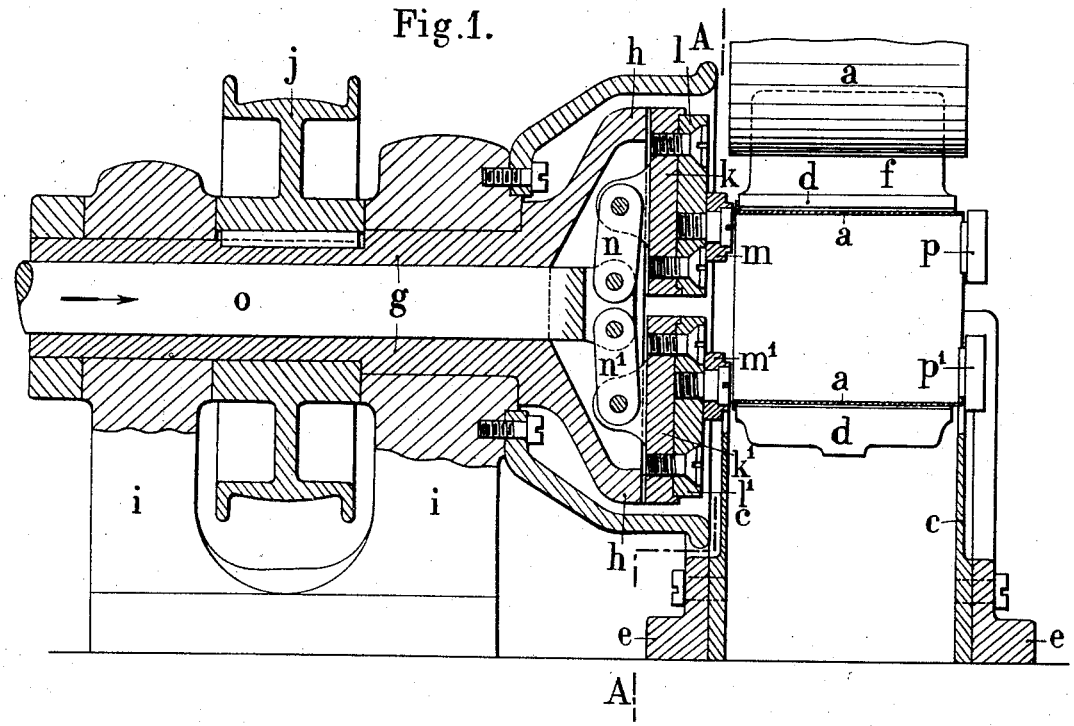

A. WILZIN.
APPARATUS FOR FLANGING THE TINS OR CANISTERS FOR PRESERVES.
APPLICATION FILED SEPT. 17, 1907.

928,618.

Patented July 20, 1909.
5 SHEETS—SHEET 3.

Witnesses:

Inventor:
Arthur Wilzin,
By Attorneys,

UNITED STATES PATENT OFFICE.

ARTHUR WILZIN, OF ST. OUEN, FRANCE, ASSIGNOR TO E. W. BLISS CO., OF BROOKLYN, NEW YORK.

APPARATUS FOR FLANGING THE TINS OR CANISTERS FOR PRESERVES.

No. 929,812.

Specification of Letters Patent.

Patented July 20, 1909.

Application filed September 17, 1907. Serial No. 393,252.

*To all whom it may concern:*

Be it known that I, ARTHUR WILZIN, of 100 Boulevard Victor Hugo, St. Ouen, Seine, Republic of France, engineer, have invented an Apparatus for Flanging the Tins or Canisters for Preserves, of which the following is a full, clear, and exact description.

In machines at present employed for flanging the body-portions of tins or canisters for preserves, an eccentric rotary movement is imparted to the tins during the flanging operation which produces exceedingly severe shocks and vibrations so that there is a tendency of the side-seams of the bodies to become broken or distorted, and further the output of these machines is very limited, since, if they operate at high speeds the shocks produced by the eccentric movement become excessive and it is impossible to accomplish the work properly.

This invention relates to a machine for obviating the above disadvantages characterized by the fact that the body-portions of the tins are held motionless during the operation and the flanging is effected progressively and without vibration by rolls to which is imparted simultaneously with their rotary movement a radial movement of translation from the interior toward the exterior of the tin.

The accompanying drawings illustrate by way of example a machine constructed according to the invention.

Figure 3:
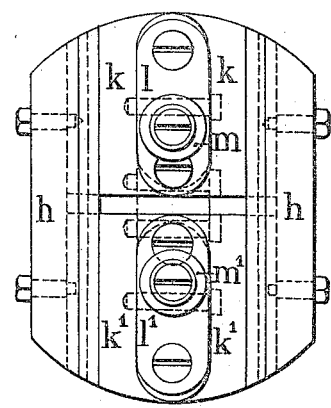
Figure 5:
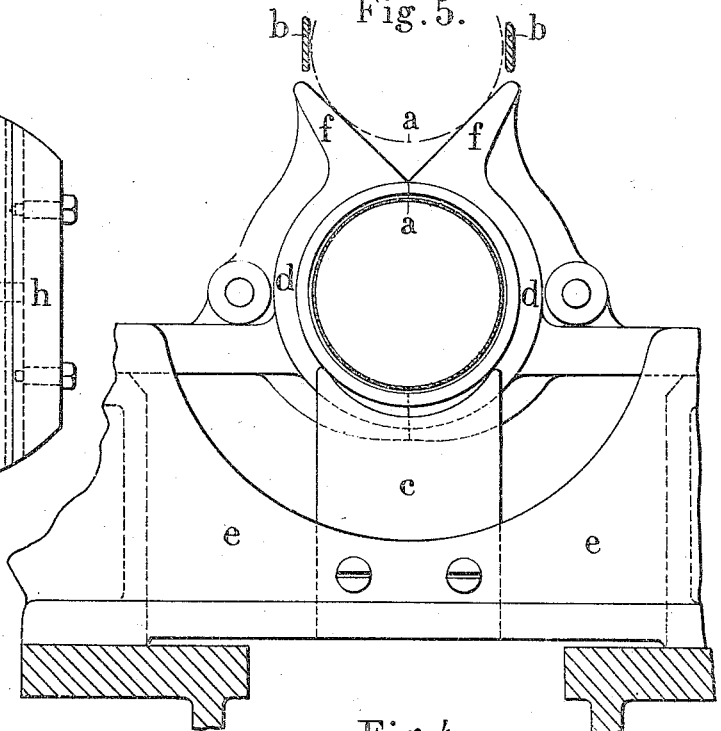
Figure 4:
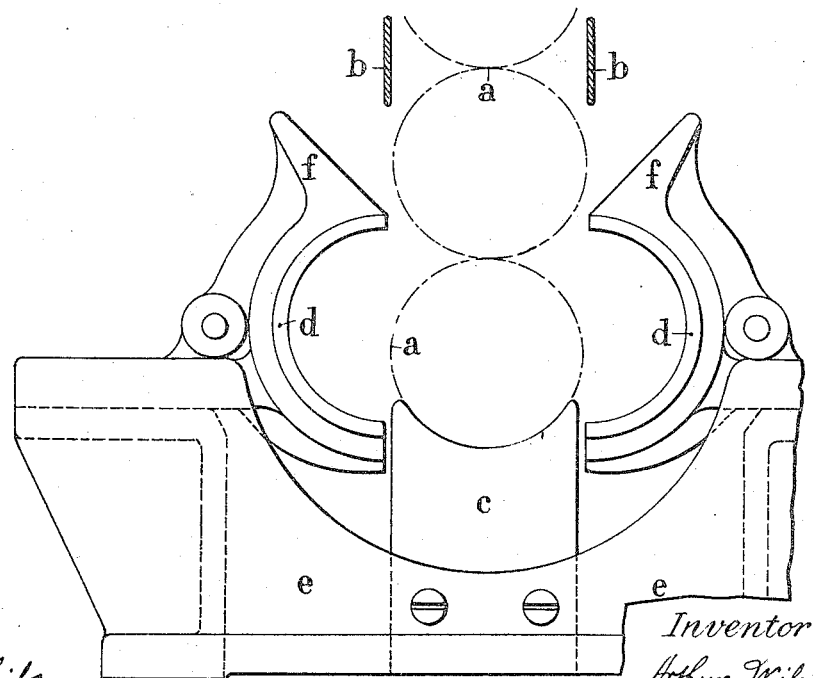
Figure 6:
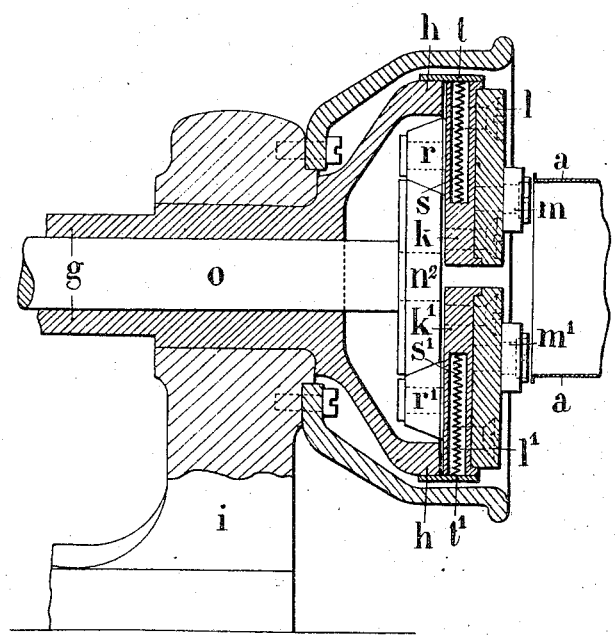
Figure 7:
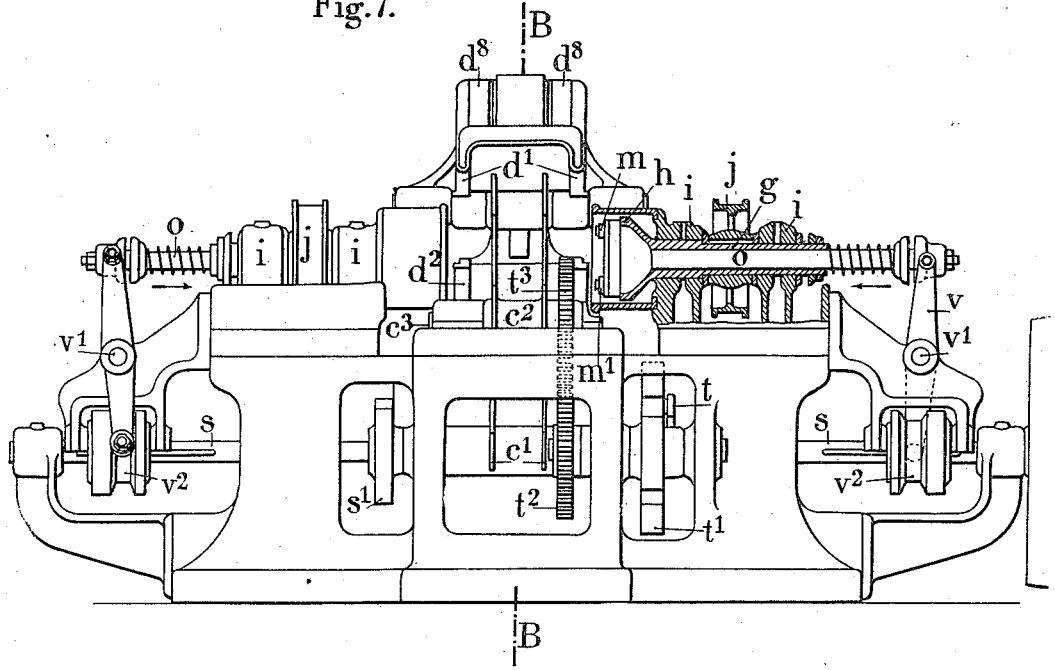
Figure 8:
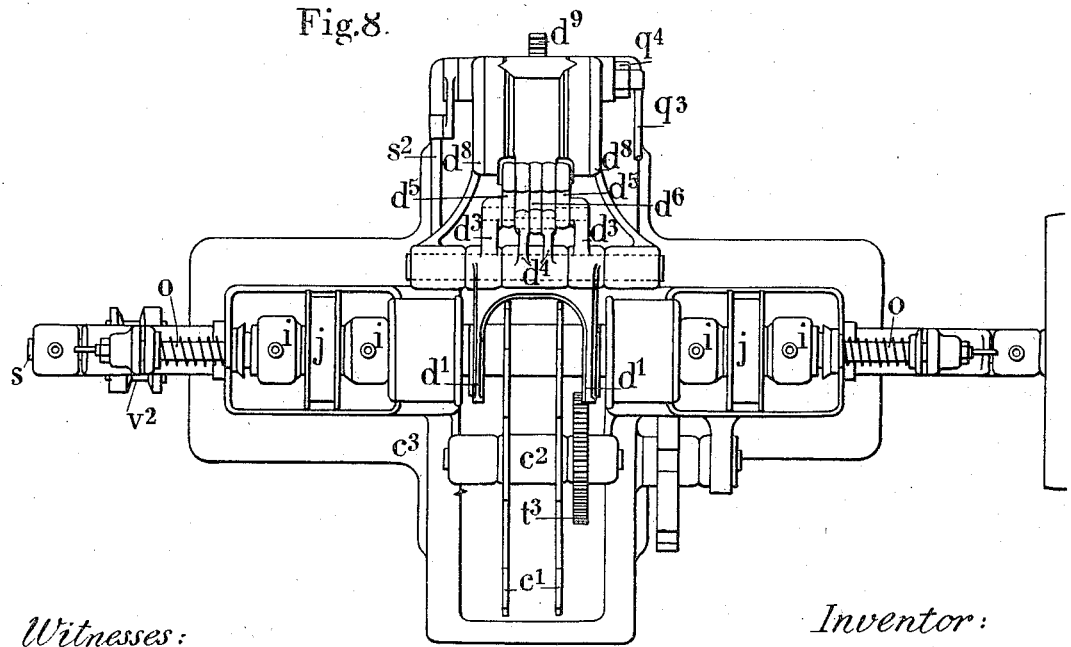
Figure 9:
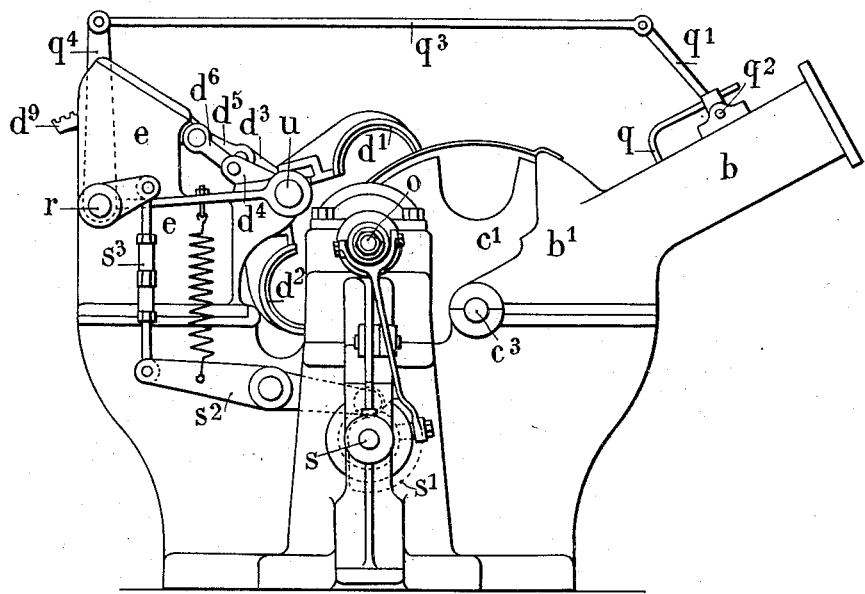
Figure 10:
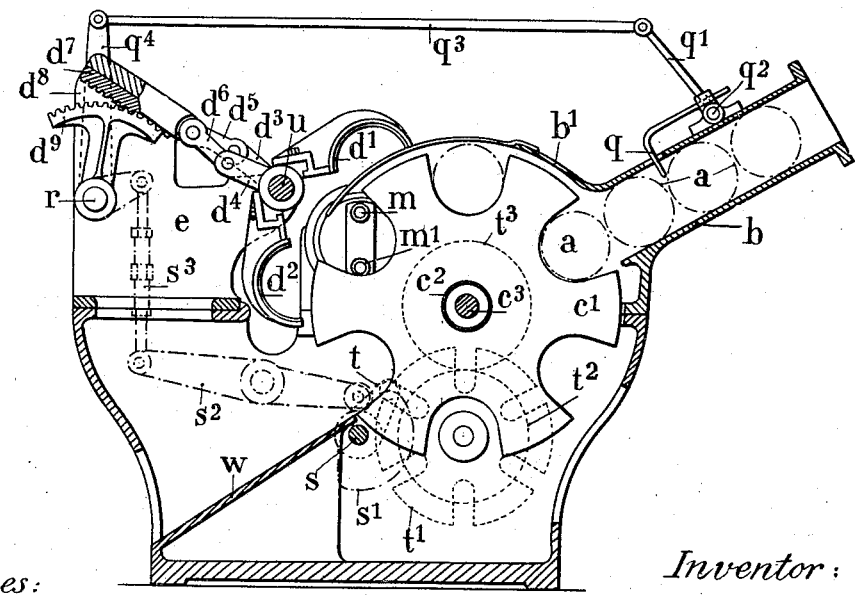

Figure 1 is a vertical longitudinal section showing a machine adapted to flange cylindrical can-bodies. Figs. 2 and 3 are two detail views showing in plan and face views respectively the mounting of the flanging rolls. Figs. 4 and 5 show in the open and closed positions respectively, in section made on line A, A, Fig. 1, the jaws for holding the can-bodies motionless during the flanging operation. Fig. 6 shows a modified form of construction adapted to flange irregularly shaped (oval, oblong and the like) can-bodies. Figs. 7 to 10 show an automatic method of carrying out the invention; Fig. 7 being an elevation, Fig. 8 a plan view, Fig. 9 an end view and Fig. 10 a section on line B, B, of Fig. 7.

As illustrated in Figs. 4 and 5 the can-bodies $a$ whereof the edges are to be flanged are placed in a vertical chute $b$ whence they fall upon two supports $c$ between which there is a sufficient interval to enable said tins to pass after having been flanged. Two movable jaws $d$ capable of displacement as shown in Figs. 4 and 5 are mounted upon a framing which also supports said fixed supports $c$; each of said jaws being formed with an inclined upper portion $f$ whereby, upon the approximation of the jaws, the column of tins above that tin which is to be gripped by the jaws is raised and the tin to be flanged is thus isolated from the remainder and the jaws are enabled to close. The closing and opening of jaws $d$ may be effected when desired by any suitable means. The flanging rolls are mounted outwardly of one or of each of the supports $c$.

Co-axially with the jaws $d$ when they are closed as in Fig. 5 is mounted a hollow shaft $g$ (Fig. 1) whereon the roll-carrier $h$ is formed; said shaft rotating in bearing $i$ and carrying a driving pulley $j$ over which a belt passes. The roll-carrier $h$ is formed with a slide-way wherein move two carriers $k, k'$, each having attached to it a saddle $l, l'$ bearing a roll $m, m'$. Said carriers $k, k'$ are connected by links $n, n'$ to shaft $o$ which is adapted to move longitudinally within the hollow shaft $g$. The rolls $m, m'$, are thus adapted to receive movement angularly of shaft $g$ and to be simultaneously shifted radially thereof. The rolls $p\ p'$ situated opposite the rolls $m, m'$ at the extremity of jaws $d$, may be mounted and driven by means similar to that already described; and further the support whereon said driving mechanism is mounted is movable so as to enable it to be moved away from and toward the jaws $d$ as desired upon the introduction between said jaws of material to be worked.

If desired the machine may be provided at one side only with a set of rolls as described above, in which case the tin to be flanged would be held at its opposite extremity during the operation by any suitable means.

The operation of the machine is as follows: The tins $a$ piled in the chute are supported on the lips $f$ of jaws $d$. When the machine is set in operation the two jaws $d$ separate from one another and the column of tins $a$ descends until the lowermost tin rests upon the supports $c$. The jaws $d$ then close upon and grip said lowermost tin $a$ and when so doing lift it slightly above the supports $c$ as shown in Figs. 1 and 5; and at the same time the lips $f$ of jaws $d$ raise the column of tins $a$ so as to isolate them from the tin to be flanged which is thus held completely motionless by the jaws $d$. The supports whereon the rolls $p$, $p'$ and $m$, $m'$ are mounted then receive a slight movement of translation so that said rolls bear with their shoulders against the edges of the can-body. This is a very important point because in this way the body is automatically and without additional mechanism centered with reference to the working faces of the jaws before the flanging action commences thus insuring flanges of equal and uniform width, an essential condition for tightness in doubled seamed cans. Then, while the roll-carrier $h$ rotates, the shaft $o$ receives a movement of translation in the direction of verse direction; the two carriers $k$, $k'$, move apart and the rolls $m$, $m'$ and $p$, $p'$ respectively flange the edges of the body $a$ against the sides of jaws $d$. When the edge or edges of the tin $a$ have been flanged the shaft $o$ receives a longitudinal movement in the reverse direction; the two carriers $k$, $k'$, move toward one another; the rolls move a short distance away from the jaws which open and allow the flanged tin $a$ to fall between the supports $c$. Then the next succeeding tin drops upon the supports $c$ and the same operations are repeated.

The modification shown in Fig. 6 is applicable to any shape of body and the radial displacement of the carriers $k$, $k'$, is controlled by a mandrel $n^2$ of the same configuration as the body to be flanged and keyed upon the shaft $o$ movable longitudinally within the hollow shaft $g$ as above described. The carriers $k$, $k'$ are each provided with a roll $r$, $r'$, maintained in contact with the mandrel by means of retracting springs $s$, $s'$ bearing upon plates $t$, $t'$ attached to the roll-carrier $h$ and constantly tending to force the carriers $k$ $k'$ toward the center of the machine.

In the machine shown in Figs. 7 to 10 the support which presents the body $a$ to the action of the rolls $m$, $m'$, $p$, $p'$, is constituted by a distributer consisting of two disks $c'$ at the peripheries of which are formed recesses whereof the configuration corresponds to that of the can-bodies said disks being keyed upon a single sleeve $c^2$ mounted free upon a spindle $c^3$. Said distributer $c'$ to which is imparted intermittent rotary movement rotates within a casing $b'$ provided with a feed chute $b$ controlling the introduction into the machine of the tins or can-bodies. The tins $a$ contained by said chute $b$ are retained when the distributer carries away the lowermost one by means of a finger $g$ which becomes disengaged from the column at the desired moment in order to allow the column of tins to advance down the chute. To this end the finger $g$ is mounted upon an oscillating arm $g'$ movable about an axis $g^2$ and connected by a rod $g^3$ to an arm $g^4$ keyed upon shaft $r$, which latter receives oscillatory movement by means of a driving shaft $s$, cam $s'$, lever $s^2$ and connecting rod $s^3$. The intermittent rotary movement of the distributer $c'$ is similarly controlled by means of shaft $s$, arm $t$, Maltese-cross-shaped member $t'$ and toothed wheels $t^2$, $t^3$; the wheel $t^2$ being integral with the Maltese-cross-shaped member $t'$ and the wheel $t^3$ being keyed upon the sleeve $c^2$. As has already been explained, the can-body $a$ carried by the distributer is held motionless opposite the rolls $m$, $m'$, $p$, $p'$, by the jaws $d'$, $d^2$, whereof the opening and closing are controlled by the following means. The aforesaid jaws, movable above a fixed axis $u$, are each provided with one or more arms $d^3$, $d^4$ connected by means of links $d^5$, $d^6$, to a rack $d^7$ movable in a guide $d^8$ and adapted to engage with a toothed sector $d^9$ keyed upon shaft $r$, to which latter oscillatory movement is imparted in a manner to be hereinafter described. As described above the two roll-carriers $h$ receive rotary movement and a radial movement of translation; the rotary movement being transmitted as mentioned above by means of sleeves $g$ through which shafts $o$ upon which are formed the carriers $h$ pass. The longitudinal reciprocatory movement of each shape $o$ is controlled by a lever $v$ movable about an axis $v'$ and actuated by cam $v^2$ keyed upon shaft $s$. The operation of the machine is as follows:—The jaws $d'$, $d^2$, being open, the distributer $c'$ having intermittent rotary motion transmitted to it by means of shaft $s$ and Maltese-cross-shaped member $t'$ places a can-body in position opposite the roll-carriers $h$ and then ceases to rotate. The jaws $d'$, $d^2$, then close under the action of the longitudinal displacement transmitted to the rack $d^7$ by the sector $d^9$ and cam $s'$, and the tin is held motionless in the desired position to be operated upon by the rolls $m$, $m'$, $p$, $p'$. The can-body being thus held in position, the two shafts $o$ are displaced longitudinally in the direction of the arrows indicated in Fig. 7, the rolls $m$, $m'$, $p$, $p'$ pass into said tin and press upon and flange the edges of the tin in the manner previously described. When the edges have been thus flanged the rolls $m$, $m'$, $p$, $p'$, disengage from the tin; the two shafts $o$ return to their initial position and the jaws $d'$, $d^2$ open. This distributer $c'$ then receives a fresh angular displacement, the tin or can-body which has been flanged falls upon the inclined plane

*w* whereby it is carried away from the machine, and at the same time the distributer brings another tin into position before the rolls *m*, *m'*, *p*, *p'*, no time being lost in operating upon successive tins.

The machine is adapted to flange can-bodies of any configuration, oval, oblong or the like, and its dimensions, arrangement of the details and method of driving may be varied in accordance with different applications.

Claims:

1. A machine for flanging the bodies of sheet metal cans, including in combination a backing member having a transverse face, a roll having a shoulder in position to engage the edge of the can-body, means for moving said roll to bring it into engagement with the can-body and to insure the latter's lying in its proper position relatively to said backing member with its edge beyond said transverse face, and means for rotating said roll about the axis of the can-body and simultaneously moving it outward from said axis to bend said edge back against said transverse face.

2. A machine for flanging the bodies of sheet metal cans, including in combination a backing member having faces transverse to the axis of the can-body and at a lesser distance from each other than the length of the can-body and lying back of the edges of the can-body in its normal position and adapted to serve as working faces against which the flanging may be done, a roll at each end of said backing member and having a flange, means for moving said rolls toward the can-body to cause said flanges to engage the edges thereof to insure the correct position of the can-body, and means for rotating said rolls about the axis of the can-body and moving them outward to bend the edges of the can-body against said transverse faces.

3. A machine for flanging the bodies of sheet metal cans, including in combination a backing member having its outer face transverse to the axis of the can-body and lying back of the edge of the can-body in the normal position of the latter, a roll adapted to engage the projecting edge of the can-body and bend it back against said transverse face to form the flange, means for rotating said roll about the axis of the can-body, and toggle mechanism operated by an axial push-rod for giving said roll an outward movement to effect the flanging, the toggles being arranged to stand substantially or approximately transverse to the push-rod in the outward position of the roll, whereby axial reaction upon the push-rod is minimized.

4. A machine for flanging the bodies of sheet metal cans, including in combination a pair of jaws adapted to be closed about the can-body so as to hold the same motionless while being flanged and having outer faces transverse to the axis of the can-body and lying back of the edge of the can-body in the normal position of the latter, means for bending the edge of the can-body back against said transverse face and an intermittently rotating feeding disk arranged to convey can-bodies in succession to said jaws.

The foregoing specification of my apparatus for flanging the tins or containers for preserves signed by me this sixth day of September 1907.

ARTHUR WILZIN.

Witnesses:
H. C. COXE,
MAURICE H. PIGNET.